(12) United States Patent
Sugawara

(10) Patent No.: US 6,504,667 B1
(45) Date of Patent: Jan. 7, 2003

(54) MAGNETIC DISK UNIT AND METHOD OF MANUFACTURE THEREOF

(75) Inventor: Naoto Sugawara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/314,016

(22) Filed: May 19, 1999

(30) Foreign Application Priority Data

Nov. 7, 1998 (JP) .......................................... 10-332045

(51) Int. Cl.⁷ .............................................. G11B 21/02
(52) U.S. Cl. ................... 360/75; 360/77.03; 360/73.03; 360/78.011; 369/112.023; 369/118
(58) Field of Search ............................... 360/77.03, 75, 360/73.03, 78.11; 29/603.3; 369/118, 112.05, 112.23

(56) References Cited

U.S. PATENT DOCUMENTS

| | | | |
|---|---|---|---|
| 5,121,371 A | 6/1992 | Farnsworth et al. | 369/44.26 |
| 5,694,214 A | * 12/1997 | Watanabe et al. | 356/237.2 |
| 5,909,333 A | * 6/1999 | Best et al. | 360/51 |
| 6,191,911 B1 | * 2/2001 | Cai et al. | 360/77.03 |
| 6,327,110 B1 | * 12/2001 | Sano et al. | 360/77.03 |

FOREIGN PATENT DOCUMENTS

| | | |
|---|---|---|
| JP | 6296619 | 6/1987 |
| JP | 6448241 | 2/1989 |

* cited by examiner

Primary Examiner—David Hudspeth
Assistant Examiner—Mitchell Slavitt
(74) Attorney, Agent, or Firm—Birch, Stewart, Kolasch & Birch, LLP

(57) ABSTRACT

A magnetic disk unit which can provide a sufficient PD output of laser beams for optical tracking. The magnetic disk unit comprises a diffraction grating for splitting laser beams from a laser source into a plurality of beams; an aperture for narrowing a plurality of laser beams from the diffraction grating and light beams reflected from the recording medium; an objective lens for converging a plurality of laser beams, radiating the laser beams onto the recording medium, and guiding light beams reflected from the recording medium to the aperture; a beam splitter for splitting the reflected light beams having passed through the aperture; and a light receiver for receiving light beams split by the beam splitter. The objective lens is an objective lens telecentric to the image side.

9 Claims, 8 Drawing Sheets

1: objective lens
2: holder
3: aperture
4: spacer
20: recording medium
21: laser source
23: 3-beam diffraction grating
27: beam splitter
28: light receiver
29: hologram element
30: LD-PD unit
32: arithmetic circuit
32a: driving amplifier
33: voice coil motor
34: magnetic head
34a: light transmitting hole
34a: light transmitting hole
35: magnetic gap
36: head supporting plate
37: carriage

| | |
|---|---|
| 1: objective lens | 30: LD—PD unit |
| 2: holder | 32: arithmetic circuit |
| 3: aperture | 32a: driving amplifier |
| 4: spacer | 33: voice coil motor |
| 20: recording medium | 34: magnetic head |
| 21: laser source | 34a: light transmitting hole |
| 23: 3—beam diffraction grating | 34a: light transmitting hole |
| 27: beam splitter | 35: magnetic gap |
| 28: light receiver | 36: head supporting plate |
| 29: hologram element | 37: carriage |

A: leaser beam
B: camera
C, D: image d: offset

φS1, φS2, φM:beam spot diameter
20b:servo stitch
P:pitch

MAGNETIC DISK UNIT AND METHOD OF MANUFACTURE THEREOF

BACKGROUND OF THE INVENTION

1. Field of the Invention

The present invention relates to a magnetic disk unit which radiates laser beams onto a recording medium and positions a magnetic head, and a method of the manufacture thereof. Specifically, the present invention relates to a magnetic disk unit for improving the quality of optical sensor signals for positioning a magnetic head, thereby improving positioning accuracy, and a method of the manufacture thereof.

2. Description of Related Art

The present mainstream of recording media attachable to and detachable from magnetic disk units is 3.5-inch disks. The track density of such recording media has reached about 2100 to 2500 TPI (tracks per inch) with the recording capacity of 100 to 120 megabytes. In order to enable recording, erasing, or playing back information of high recording densities, accurate positioning of a magnetic head to a recording medium is essential. Therefore, a recording medium is provided with a servo stitch for detecting the position of an optical tracking servo, and on the positioning of a magnetic head to magnetic tracks, closed-loop optical servo control is performed using the servo stitch for position detecting.

FIG. 7 is a diagram illustrating a conventional magnetic disk unit. FIG. 8 is a diagram illustrating the optical system of the magnetic disk unit shown in FIG. 7. In FIGS. 7 and 8, the numeral 20 indicates a disk recording medium; 20a indicates lands of specific lengths formed concentrically on the bottom surface of the recording medium 20; 20b indicates position detecting servo stitches comprising grooves provided intermittently having a reflection factor different from the reflection factor of the lands 20a; 21 indicates a laser source (hereafter referred to as LD); 22 indicates a laser beam emitted from the LD 21; 23 indicates a 3-beam diffraction grating which splits the laser beam 22 into three beams; 24 indicates an aperture; 25 indicates an objective lens for converging the laser beam 22 from a hologram element 29, and guiding reflected light beams from the recording medium 20 to the hologram element 29; 26 indicates a mirror for guiding the laser beam 22 to the recording medium 20, and guiding light beams reflected from the recording medium 20 to the objective lens 25; 27 indicates a beam splitter; 28 indicates a photodiode (hereafter referred to as PD), which has three light receiving parts 28a–28c; 29 indicates a hologram element comprising the aperture 24 and the beam splitter 27; and 30 indicates a laser source-photodiode unit (hereafter referred to as LD-PD unit) comprising the LD 21, the PD 28, and the hologram element 29.

Also, 31a–31c indicate amplifiers; each of RSM, RS1, and RS2 indicates a feedback resistance; 32 indicates an arithmetic circuit; 32a indicates a driving amplifier; and 33 indicates a voice coil motor for moving a carriage 37.

Furthermore, 34 indicates a magnetic head for recording information on 2the recording medium 20 or playing back information recorded on the recording medium 20; 34a indicates a light path for passing the laser beam and reflected light beams; 35 indicates a magnetic gap of the magnetic head 34; 36 indicates a head support plate for supporting the magnetic head 34; and 37 indicates a carriage for fixing the head support plate 36, and movably supporting the structure comprising components 21–30 together with the magnetic head 34.

The operation of this unit will be described below referring to FIGS. 7 and 8. The recording medium 20 is rotated by a medium driving motor (not shown) at a constant speed. The magnetic head 34 is supported by the head support plate 36, and the magnetic gap 35 slides on the bottom surface of the recording medium 20.

FIG. 8 is a conceptual diagram illustrating sensing the tracking information of the magnetic disk unit and illustrating a closed-loop optical servo control. The laser beam 22 emitted from the LD 21 passes through the 3-beam diffraction grating 23, and split into three laser beams 22a, 22b, and 22c, which pass through the aperture 24 and enter in the objective lens 25. Laser beams 22a, 22b, and 22c, which have passed through the objective lens 25, are reflected from mirror 26 and radiated onto the bottom surface of the recording medium 20 perpendicularly, and form three corresponding beam spots M, S1, and S2 on the surface of the recording medium 20. At this time, the optic axis of the laser beam 22 emitted from the LD 21 is in parallel to the recording medium 20.

Here, if the laser beam 22 parallel to the recording medium 20 emitted from the LD 21 is radiated onto the recording medium 20 perpendicularly using a mirror 26, the adjustment of the optic axis is difficult because this principle acts with light beams reflected by the mirror 26. Therefore, corresponding the fluctuation of the angle of the mirror 26 and the angle of the laser beam 22 radiated onto the bottom surface of the recording medium 20, the adjustment for optimizing the quantity of laser beams that return to light receivers 28a to 28c by aligning the LD-PD unit 30 shown in FIG. 7 in X and Y directions.

Since the light path of the laser beam 22 can be set long by using mirror 26 regardless of the limitation of the thickness of the magnetic disk unit, the effective diameter of the objective lens 25 for achieving the beam-spot diameters φM, φS1, and φS2 can be expanded, and the quantity of light into light receivers 28a to 28c can be increased.

As FIG. 8 shows, servo stitches 20b, which represent information, are formed on the bottom surface of the recording medium 20. The magnetic disk unit senses the location from difference in the quantity of reflected light from beam spots M, S1, and S2 in terms of reflection factors between the land 20a on the bottom surface of the recording medium 20 where no locating servo stitches 20b are present and the locating servo stitches 20b. Three reflected light beams from the recording medium 20 (shown by dotted line in FIG. 8) enter into the objective lens 25. Since the optical system is a non-telecentric system, the three reflected light beams after passing through the objective lens 25 do not necessarily pass through the center of the aperture 24, and are guided by the beam splitter 28 to light receivers 28a to 28c.

Although the three reflected light beams are received by the light receivers 28a to 28c respectively, they not always pass through the center of the aperture 24. Therefore, the light-beam receiving ratios of the light receivers 28a to 28c vary according to the angle of the mirror 26 and the angle of the laser beam 22 radiated to the bottom surface of the recording medium 20. In order to optimize the quantity of the laser beams returning to the light receivers 28a to 28c, the quantity of light beams are adjusted so that the quantity of light beams received by the light receiver 28a corresponding to the beam spot M is maximized, and the quantities of light beams received by the light receivers 28b and 28c corresponding to the beam spots S1 and S2 are equalized.

FIG. 9 shows the relationship between the servo stitch 20b, Beam spots M, S1, and S2, and the output of PD 28. As FIG. 9 shows, tracking information, that is the position data in the radial direction of the recording medium 20, is determined by the quadrature phase method through the use of the output values of the light receivers 28a to 28c when the beam spots M, S1, and S2 traverse the servo stitch 20b in the radial direction. The output waveform of PD 28 at this time must be sinusoidal waves, and for this reason each of the beam spot diameters φM, φS1, and φS2 is optimized according to the pitch P of the servo stitch 20b. This optimization depends on the diameter of the circular aperture 24.

Furthermore, in order to determine the tracking position information, outputs EM, ES1, and ES2 after amplification by amplifiers 31a to 31c corresponding to the outputs of the receivers 28a to 28c must be equalized. The outputs EM, ES1, and ES2 can be equalized by making the ratio of resistances RM, RS1, and RS2 the reciprocal ratio of the beam splitting ratio of the laser beam 22 by the 3-beam diffraction grating 23. In non-telecentric system, on the other hand, the adjustment of optical axes and the adjustment of positions of the receivers 28a to 28c are required for passing through the aperture 24 the reflected light beams of beam spots S1 and S2 from the recording medium 20 evenly as described above.

Tracking information can be obtained from the results of outputs EM, ES1, and E2 computed based on the principle of the quadrature phase method, and transmitted to a driving amplifier 32a for driving the voice coil 33. A current corresponding to the error of the tracking position drives the voice-coil motor 33, and a magnetic gap 35 maintaining a certain distance to beam spots M, S1, and S2 is positioned on a specific track. By this, closed loop optical servo control is carried out.

The magnetic disk unit is adjusted when manufactured so that the direction of three laser beams 22a to 22c form predetermined angles against the position sensing servo switch 20b when the three laser beams 22a to 22c are radiated to the position sensing servo switch 20b.

Since conventional magnetic disk units are constituted as described above, the beam spot diameters φM, φS1, and φS2 of three laser beams must be adjusted to form images accurately on the bottom surface of the recording medium 20. The accuracy of the laser beams in the optical axis direction, or focussing accuracy, must be ±50 μm, and the adjustment of focussing requiring the accuracy of ±50 μm is normally carried out by adjusting the position of the objective lens 25. However, since the hologram element 29, the objective lens 25, the mirror 26, and other elements are independent parts, the relative position of each part must be delicately adjusted. Furthermore, the tilt of the objective lens 25 must be taken into consideration, making focus adjustment difficult.

In order that the light receivers 28a to 28c sense reflected light beams accurately, the alignment of the optical axis of the laser beam 22 to the position sensing servo switch 20a is required. However, this operation is also difficult because the LD-PD unit 30, the objective lens 25, and the mirror 26 are independent parts. Also, since the objective lens 25 is non-telecentric, the reflected light beams from the recording medium 20 do not always pass through the center of the aperture 24, resulting in the imbalance of outputs from the light receivers 28a to 28c. Therefore, in order to make EM maximum and to equalize ES1 and ES2 finally, the position adjustment of each part, in particular of the LD-PD unit 30 is essential.

In the structure to make laser beams 22 parallel to the surface of the recording medium 20 traverse perpendicularly to the surface of the recording medium 20, the accuracy of installation angle of the mirror 26 becomes strict due to the principle of optical lever, which, together with the effect of the non-telecentric optical system, makes difficult the adjustment of sensing accuracy by the light receivers 28a to 28c.

Since the LD-PD unit 30, the objective lens 25, the mirror 26, and the like elements are independent parts, the adjustment of positions and the reduction of size and weight of the optical system are difficult, and the servo properties of magnetic disk units cannot be improved.

SUMMARY OF THE INVENTION

The present invention solves the problems described above. It is an object of the present invention to provide a magnetic disk unit by which a sufficient output of laser beams for optical tracking. It is another object of the present invention to make laser beams traverse perpendicularly to a recording medium without using mirrors for simplifying tilt adjustment. It is another object to provide a magnetic disk unit which can simplify or eliminate focussing adjustment and the like. It is a further object of the present invention to improve the servo properties of magnetic disk units through the weight reduction of the optical system.

According to a first aspect of the present invention, there is provided a magnetic disk unit for optically sensing tracking information recorded on a disk recording medium, thereby positioning a magnetic head to a predetermined recording track on the recording medium, and magnetically recording information on the recording medium, or playing back recorded information, the magnetic disk unit comprising: an optical means installed underneath the magnetic head for radiating a laser beam onto the recording medium through a light path provided in the magnetic head and receiving the reflected beam, the optical means having: a laser source, a diffraction grating for splitting the laser beam from the laser source into a plurality of beams, an aperture for controlling the cross-sections of a plurality of laser beams from the diffraction grating and reflected light beams from the recording medium, an objective lens for converging a plurality of laser beams from the aperture and irradiating the recording medium as well as guiding the reflected light beams from the recording medium to the aperture, a beam splitter for splitting the reflected light beams transmitted through the aperture, and a light receiving member for receiving light beams split by the beam splitter, wherein the object lens being an objective lens telecentric toward the image surface.

According to a second aspect of the present invention, there is provided a method of manufacturing a magnetic disk unit for optically sensing tracking information recorded on a disk recording medium, thereby positioning a magnetic head to a predetermined recording track on the recording medium, and magnetically recording information on the recording medium, or playing back recorded information, the magnetic disk unit comprising: an optical means installed underneath the magnetic head for radiating a laser beam onto the recording medium through a light path provided in the magnetic head and receiving the reflected beam, the optical means having: a laser source, a diffraction grating for splitting the laser beam from the laser source into a plurality of beams, an aperture for controlling the cross-sections of a plurality of laser beams from the diffraction grating and reflected light beams from the recording medium, an objective lens for converging a plurality of laser beams from the aperture and irradiating the recording medium as well as guiding the reflected light beams from the recording medium to the aperture, a beam splitter for splitting the reflected light beams transmitted through the aperture, and a light receiving member for receiving light beams split by the beam splitter, wherein the object lens being an objective lens telecentric toward the image surface, wherein the laser source, the diffraction grating, the aperture, the objective lens and the recording medium are arranged in a layered structure in the height direction, and the distance between the upper surface of the objective lens and the recording medium is a predetermined length, the method comprising the steps of: radiating referent parallel light beams passing through the aperture from the side of the laser source for allowing the center of the aperture to coincide with the center of the objective lens; and assembling the aperture and the objective lens so that the center of the aperture coincides with the image-forming light from the objective lens.

According to a third aspect of the present invention, there is provided a method of manufacturing a magnetic disk unit for optically sensing tracking information recorded on a disk recording medium, thereby positioning a magnetic head to a predetermined recording track on the recording medium, and magnetically recording information on the recording medium, or playing back recorded information, the magnetic disk unit comprising: an optical means installed underneath the magnetic head for radiating a laser beam onto the recording medium through a light path provided in the magnetic head and receiving the reflected beam, the optical means having: a laser source, a diffraction grating for splitting the laser beam from the laser source into a plurality of beams, an aperture for controlling the cross-sections of a plurality of laser beams from the diffraction grating and reflected light beams from the recording medium, an objective lens for converging a plurality of laser beams from the aperture and irradiating the recording medium as well as guiding the reflected light beams from the recording medium to the aperture, a beam splitter for splitting the reflected light beams transmitted through the aperture, and a light receiving member for receiving light beams split by the beam splitter, wherein the object lens being an objective lens telecentric toward the image surface, wherein the laser source, the diffraction grating, the aperture, the objective lens and the recording medium are arranged in a layered structure in the height direction, and the distance between the upper surface of the objective lens and the recording medium is a predetermined length, the method comprising the step of: assembling the aperture and the objective lens so that the center of the aperture offsets from the center of the objective lens depending upon the angle between the bottom surface of the magnetic head and the recording media sliding surface.

The above and other objects, effects, features and advantages of the present invention will become more apparent from the following description of the embodiments thereof taken in conjunction with the accompanying drawings.

DETAILED DESCRIPTION OF THE PREFERRED EMBODIMENTS

Figure 1:
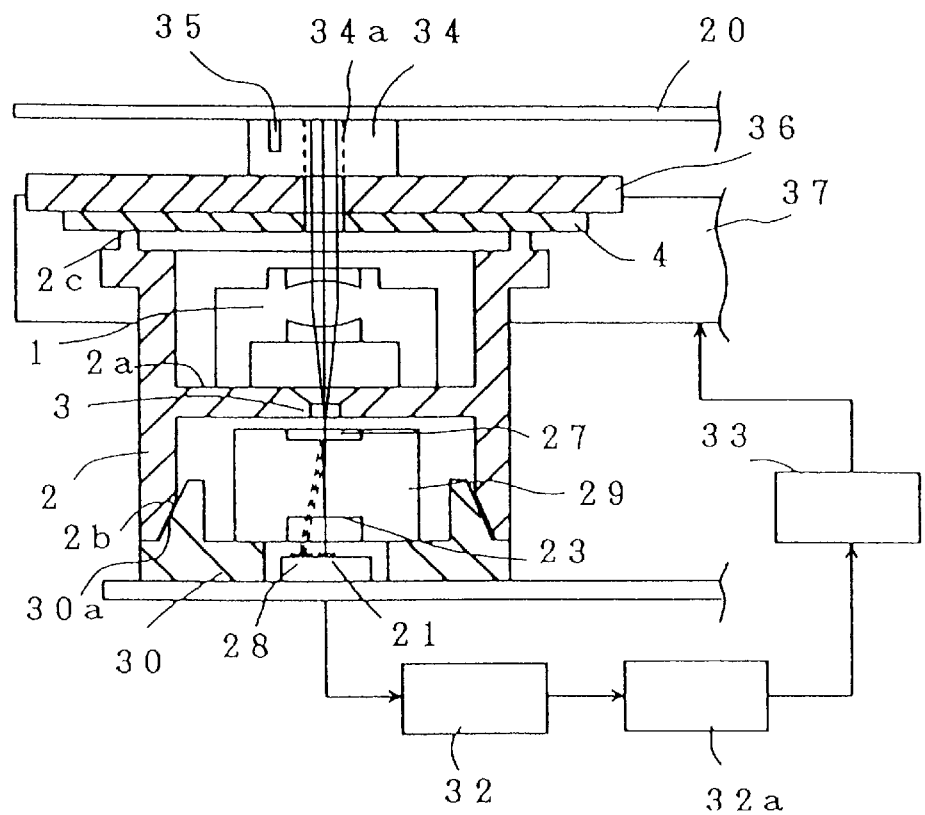
FIG. 1 is a diagram illustrating an optical means according to embodiment 1.

Embodiments of the present invention will be described below with reference to the accompanying drawings. It is noted that the same reference symbols in the drawings denote the same or corresponding components.

EMBODIMENT 1

Figure 2:
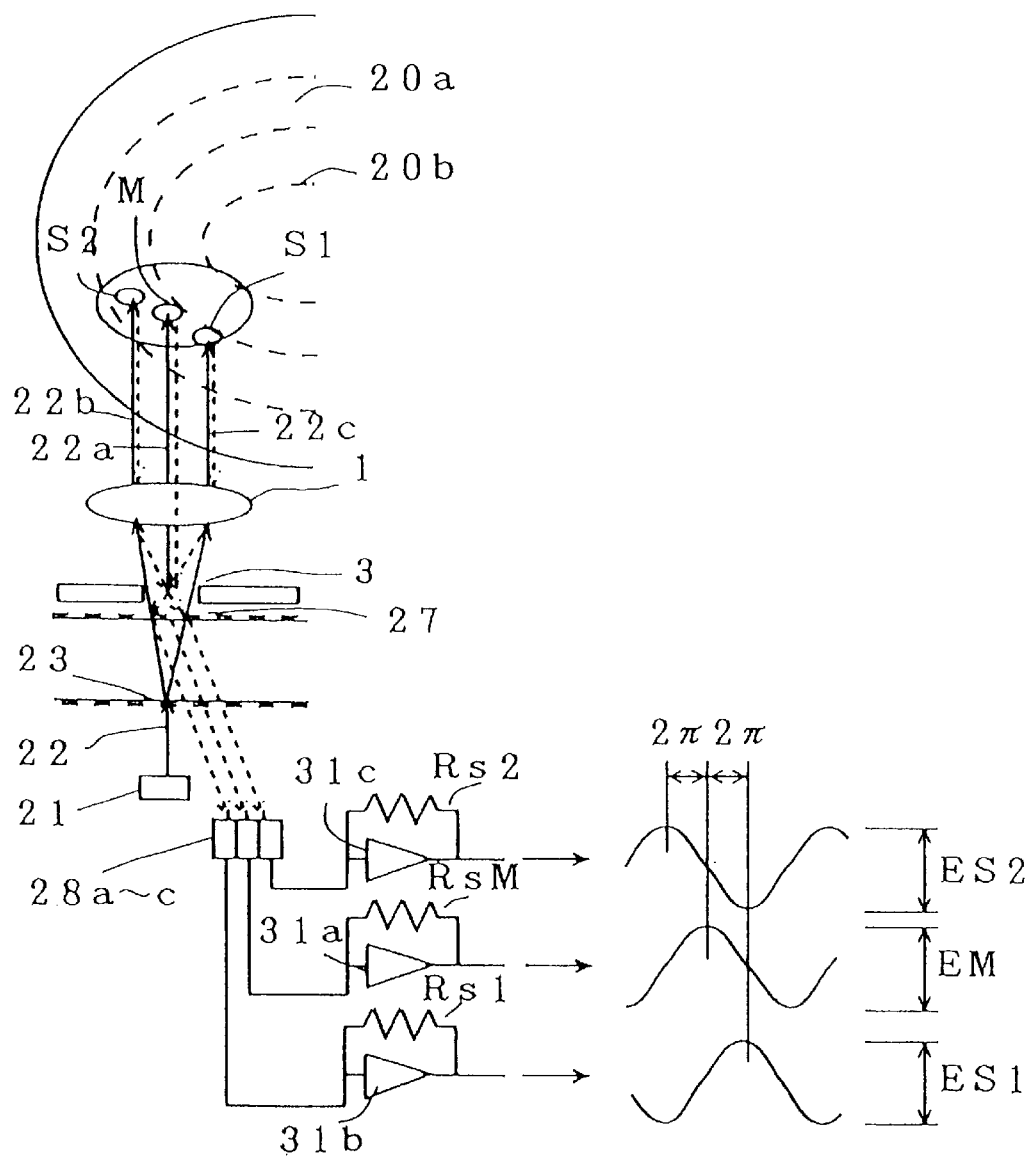
FIG. 2 is a diagram illustrating the principle of tracking information sensing by the optical means shown in FIG. 1.

An embodiment of the present invention will be described below referring to attached drawings, FIG. 1 is a diagram illustrating an optical means according to embodiment 1, and FIG. 2 is a diagram illustrating the principle of tracking information sensing by the optical means shown in FIG. 1. In FIGS. 1 and 2, the same numerals indicate identical or corresponding parts shown in FIGS. 7 through 9, for which description will be omitted. Numeral 1 is an objective lens converging the laser beams 22 from the hologram element 29 and guiding the light beams reflected from the recording medium 20 into the hologram element 29, numeral 2 is a holder for holding the objective lens 1, numeral 3 is an elliptical aperture which may be in the form of ellipse or the like and is integrally formed in the holder 2, and numeral 4 is a spacer. This optical means according to embodiment 1 is constituted as a telecentric system. That is, the objective lens 1 is arranged so that the f-value of the objective lens 1 is almost equal to the distance between the objective lens 1 and the aperture 3 to create a telecentric system against the image side. The objective lens 1, the aperture 3, the hologram element 29, and the LD-PD unit 30 constituting the optical means are arranged as a laminar structure. An optical means optically sensing a position comprises the elements carrying numerals 1 through 4, 21, 23, and 27 through 30. A magnetic head performing optical positioning comprises the elements carrying numerals 34 through 36 in addition to the above.

Figure 7:
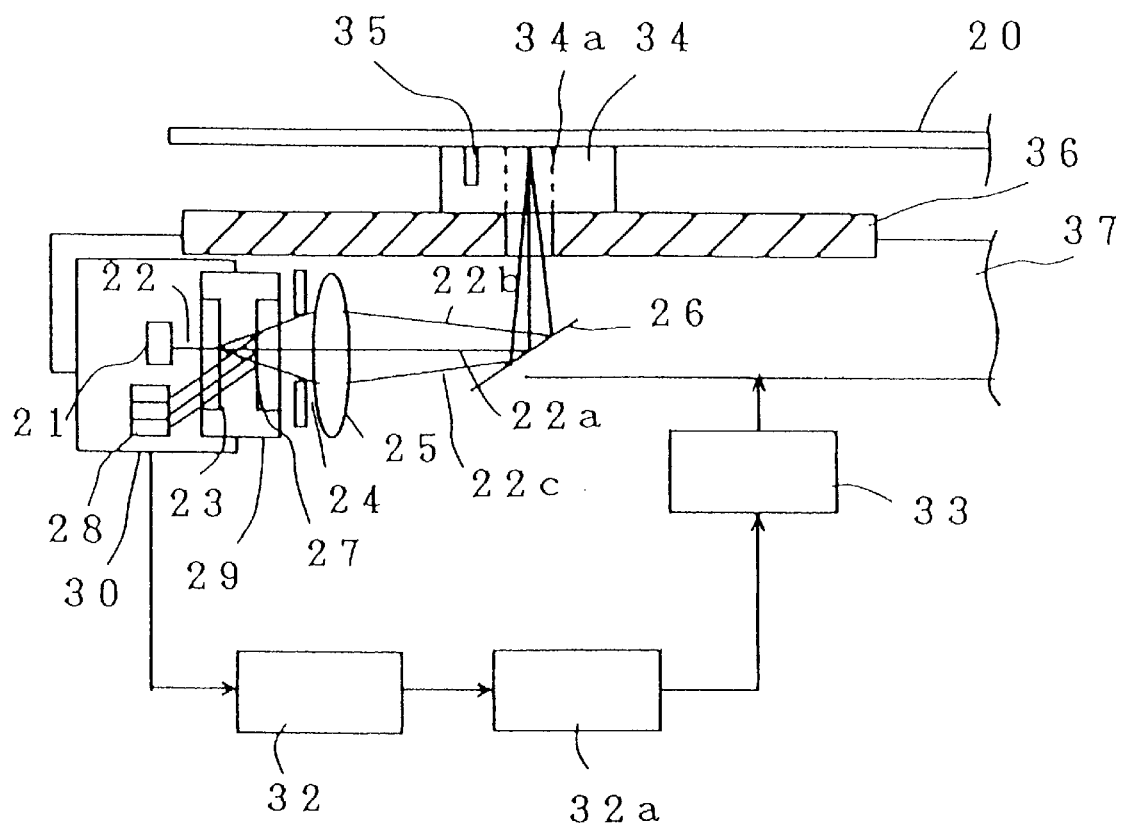
FIG. 7 is a diagram illustrating a conventional magnetic disk unit.
Figure 8:
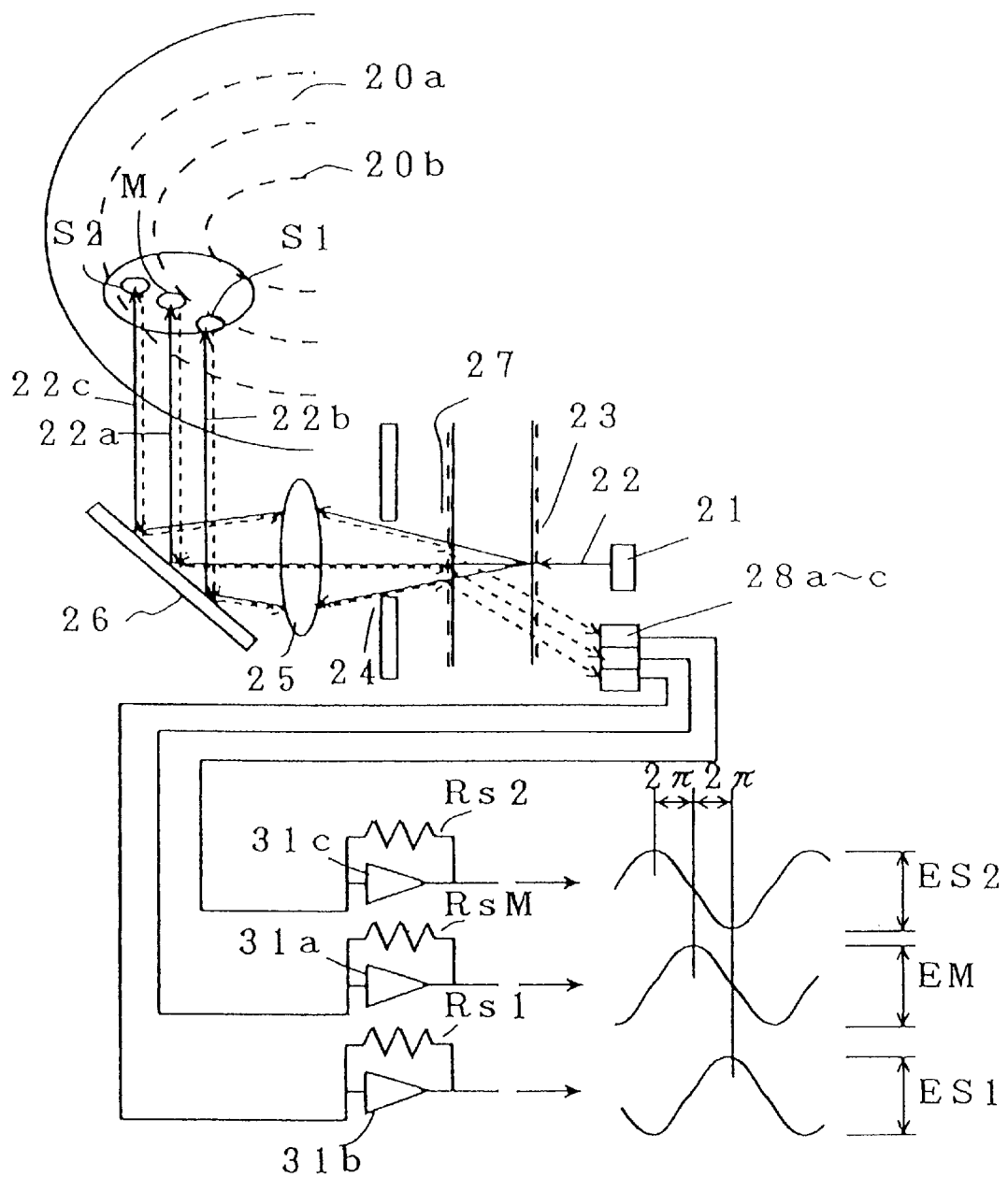
FIG. 8 is a diagram illustrating the optical system of the magnetic disk unit shown in FIG. 7.

Next, the operation will be described referring to FIGS. 1 and 2. The laser beams 22 generated by the laser source 21 pass through a 3-beam diffraction grating 23, and are split into three laser beams 22a to 22c, which pass through the aperture 3 and enter in the objective lens 1. The laser beams 22a to 22c after passing through the objective lens 1 are radiated perpendicularly to the bottom surface of the recording medium 20 through a light transmitting hole 34a, and converged on the surface of the recording medium 20 as three beam spots M, S1, and S2 corresponding to the three laser beams 22a to 22c. At this time, the optical axis of the laser beams 22 generated by the laser source 21 is perpendicular to the recording medium 20. Unlike background art, in which laser beams 22 parallel to the surface of a recording medium 20 are deflected by mirrors 26 and the like and radiated onto the recording medium 20 perpendicularly as FIG. 7 shows, the optical means according to the present invention is not subjected to the principle of optical levers, and facilitates the adjustment of the optical axis.

On the bottom surface of the recording medium 20 is formed servo stitches 20b for sensing the position by the difference of reflection rate between the land 20a and the servo-stitch 20b in terms of the difference between light reflected from the beam spots M, S1 and S2. The three reflected light beams from the recording medium 20 (shown by dotted lines) enter in the objective lens 1. Since the optical system is telecentric, the three reflected light beams after passing through the objective lens 1 pass through the center of the aperture 3, and guided to the beam splitter 27. The three reflected light beams are then guided by the beam splitter 27 to the PD 28, and received by the light receivers 28a to 28c.

Figure 9:
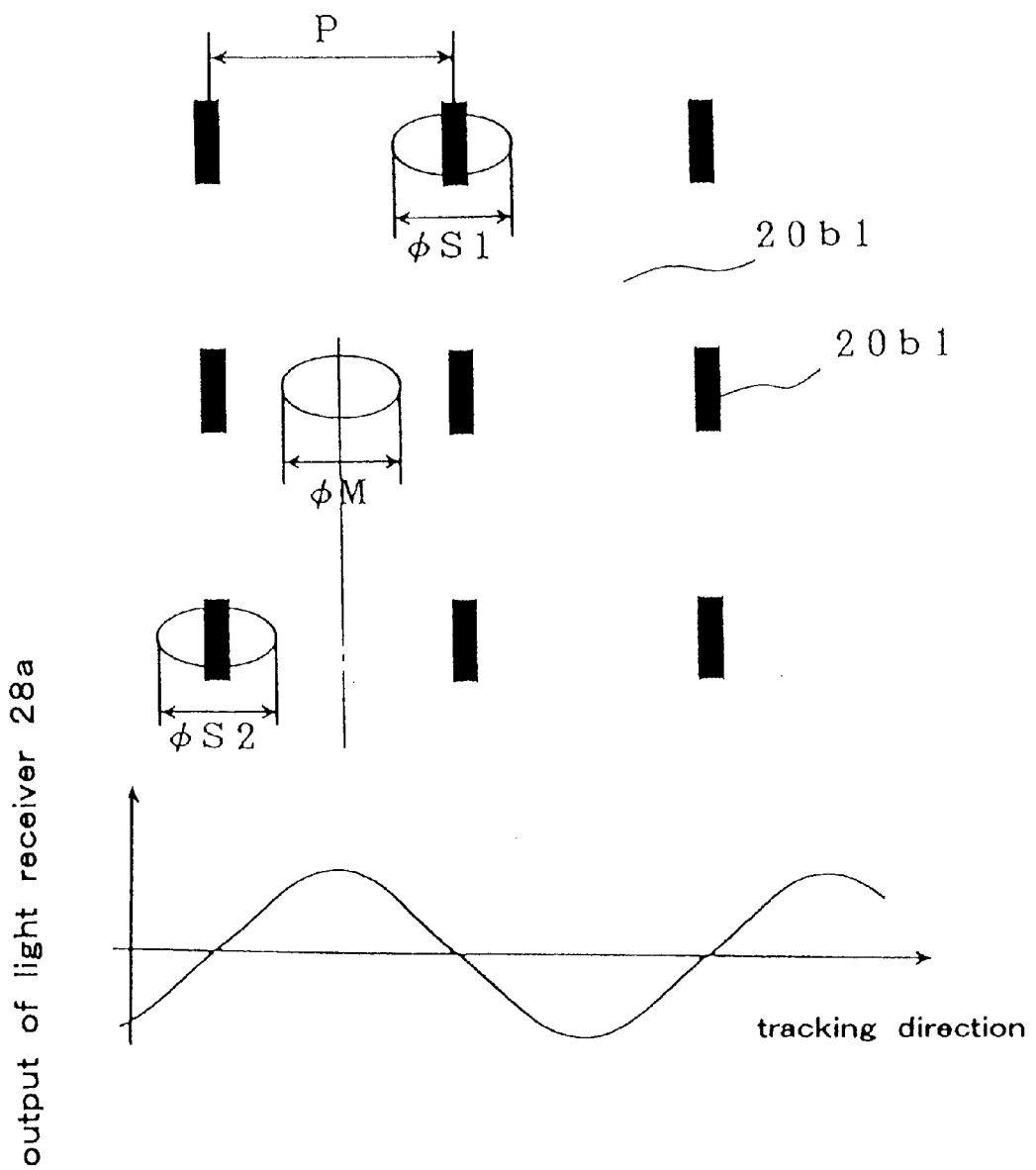
FIG. 9 shows the relationship between the servo stitch 20b, Beam spots M, S1, and S2, and the output of PD 28.

Similarly to the embodiment shown in FIG. 9, tracking information, that is the position information in the radial direction of the recording medium 20, is determined by the quadrature phase method using the output values of the light receivers 28a to 28c when beam spots M, S1, and S2 traverse the servo stitches 20b in the radial direction.

At this time, the output waveform of the PD 28 must be sinusoidal, and for this each of beam spot diameters φM, φS1, and φS2 are optimized corresponding to the pitch P of the servo stitches 20b. This optimization is performed depending on the length of the minor axis of the elliptical aperture 3. By increasing the length of the major axis of the aperture 3 within the effective diameter of the objective lens 1, the quantity of laser beams 22 passing through the objective lens 1 can be increased.

Furthermore, in order to determine tracking position information, the outputs EM, ES1, and ES2 after amplifying with amplifiers 31a to 31c corresponding to the outputs of the light receivers 28a to 28c must be equalized by resistors RM, RS1, and RS2. By making the ratio of RM, RS1, and RS2 reciprocal to the splitting ratio of the laser beams 22 with the 3-beam diffraction grating 23, EM, ES1, and ES2 can be equalized. However, since the system is telecentric, the reflected light beams of laser spots S1, and S2 from the recording medium 20 can easily and evenly pass through the aperture 3, thus facilitating the adjustment of optical axes and the adjustment of positions of the light receivers 28a to 28c.

As the tracking information, outputs EM, ES1, and ES2 of the light receivers 28a to 28c can be calculated by the arithmetic circuit 32 based on the principle of the quadrature phase method, and is transmitted to the driving amplifier 32a which drives the voice-coil motor 33. Thus, a current corresponding to the tracking position error drives the voice-coil motor 33, allowing the carriage 37 supporting the optical system and the magnetic head 34 to move, and positions the magnetic gap 35 maintaining a certain distance to beam spots M, S1, and S2 on a desired track.

As FIG. 1 shows, the objective lens 1 is aligned and adhered to the reference surface 2a for installing the lens on the holder 2, and a through-hole, or aperture 3, is formed in the reference surface 2a. The holder 2 and the hologram element 29 are adhered and secured on the LD-PD unit 30. The position accuracy of the laser source 21 and the PD 28 against the center of the aperture 3 is determined by the fitting accuracy between the outer diameter of the cylindrical portion 30a of the LD-PD unit 30 and the inner diameter of the cylindrical portion 2b of the holder 2.

The distance L between the upper surface of the objective lens 1 and the bottom surface of the recording medium 20 is determined by the distance between the upper surface of the objective lens 1 and the upper portion 2c of the holder 2, the thickness of the spacer 4, the thickness of the head supporting plate 36, and the height of the magnetic head 34. Since beam spot diameters φM, φS1, and φS2 change with change in L, the dimensional variation of the objective lens 1, the holder 2, the head supporting plate 36, and the magnetic head 34 can be absorbed by the use of the spacer 4. That is, if spacers 4 of different thickness are previously prepared, a spacer 4 inserted for adjusting beam spot diameters φM, φS1, and φS2 depending on the measured values of beam spot diameters φM, φS1, and φS2 can be selected. By such a constitution, no adjustment of the position of the objective lens 25 in the optical axis direction is required for obtaining sinusoidal waves while monitoring the waveforms of EM, ES1, and ES2 as in background art, and optimal beam spot diameters φM, φS1, and φS2 can be obtained without using complex adjusting equipment.

As FIG. 1 shows, the head supporting plate 36 is adhered to the carriage 37 which is moved by the voice-coil motor 33, and the amount of movement of the voice-coil motor 33 is equal to the amount of movement of the magnetic head 34, that is the amount of movement of the magnetic gap 35.

Figure 3:
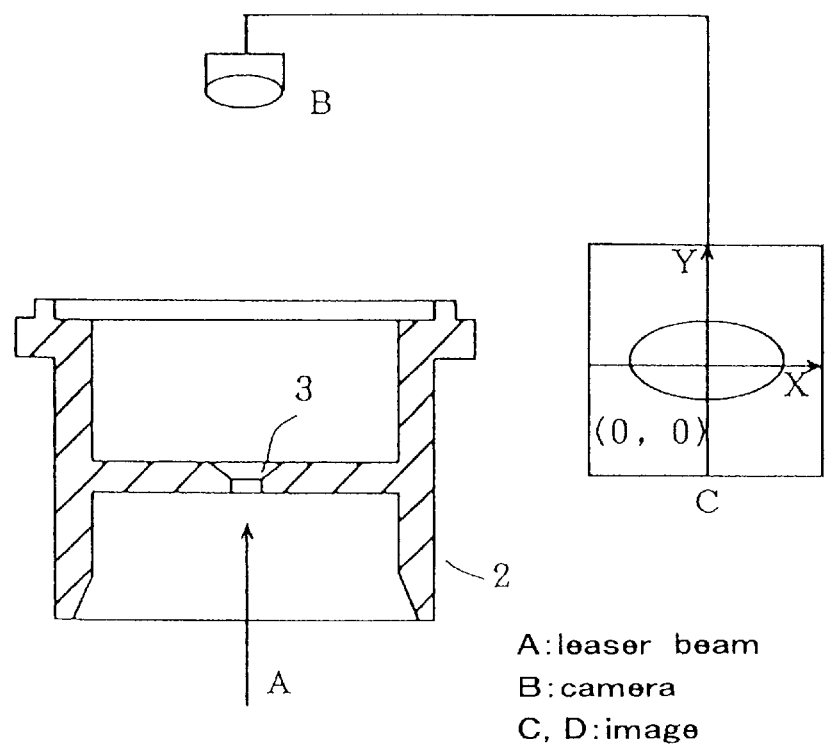
FIGS. 3 and 4 are diagrams illustrating the method for aligning and adhering the center of the objective lens 1 to the center of the aperture 3.
Figure 4:
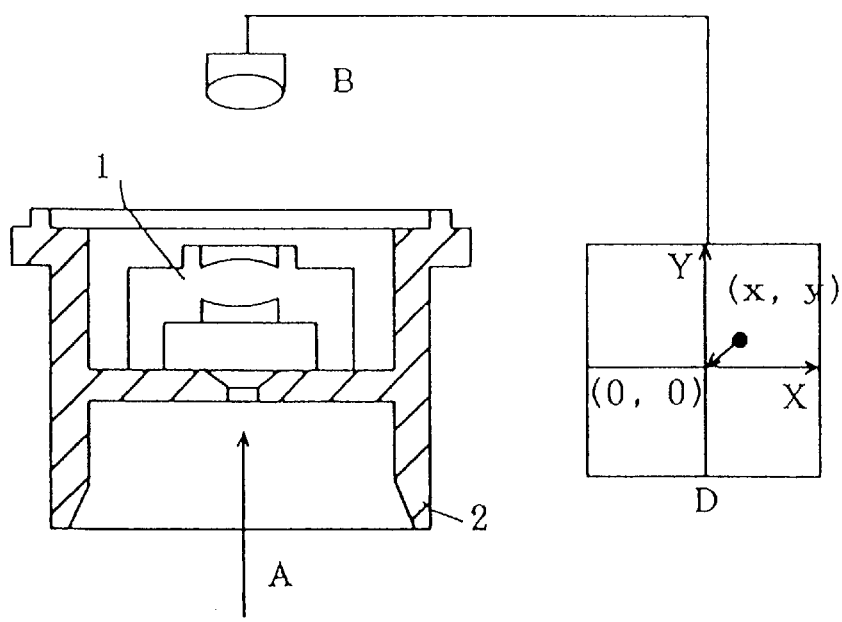

FIGS. 3 and 4 are diagrams illustrating the method for aligning and adhering the center of the objective lens 1 to the center of the aperture 3. First, as FIG. 3 shows, a laser beams A which are reference parallel light beams are radiated from the bottom surface of the holder 2 which is in the light source side of the objective lens 1 perpendicularly to the reference plane 2a for installing the lens of the holder 2. At this time, the image having passed through the camera B is the image C, which shows the image of the aperture 3. Here, the cursors X and Y are placed at the center of the image C to establish the center coordinate (0, 0). Next, the objective lens 1 is placed on the reference plane 2a for installing the lens, and the position of the camera B is moved upward in FIG. 4 to obtain the image D. Since the coordinate (x, y) of the image D is the central coordinate of the objective lens 1, if the objective lens 1 is aligned in the reference plane 2a for installing the lens so as to coincide (x, y) with (0, 0), the center of the aperture 3 can be coincided with the center of the objective lens 1. Since the incident angle to the recording medium 20 is determined by the surface of the recording medium 20 and the extension of the line connecting the center of the objective lens 1 and the center of the aperture 3, the tilt properties of the optical system can be improved by coinciding the both centers.

Figure 5:
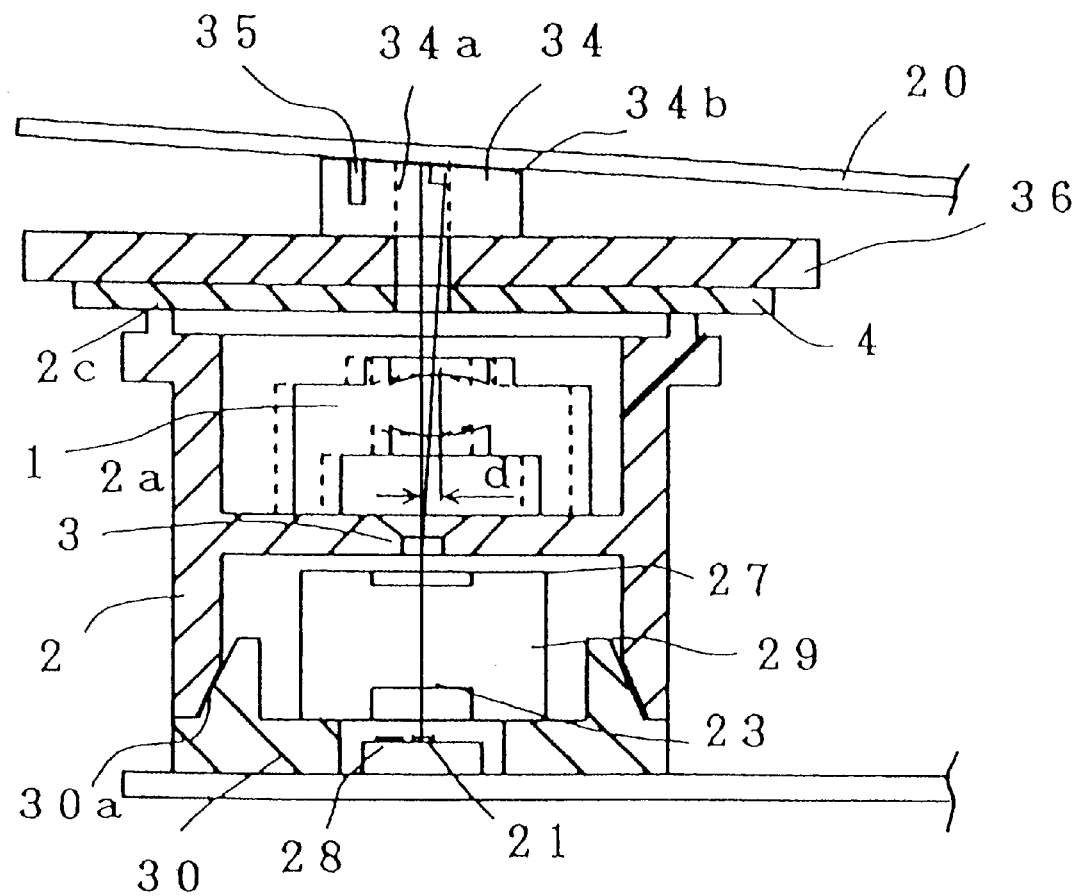
FIG. 5 is a diagram illustrating a method of adjusting a tilted optical axis in the present invention.
Figure 6:
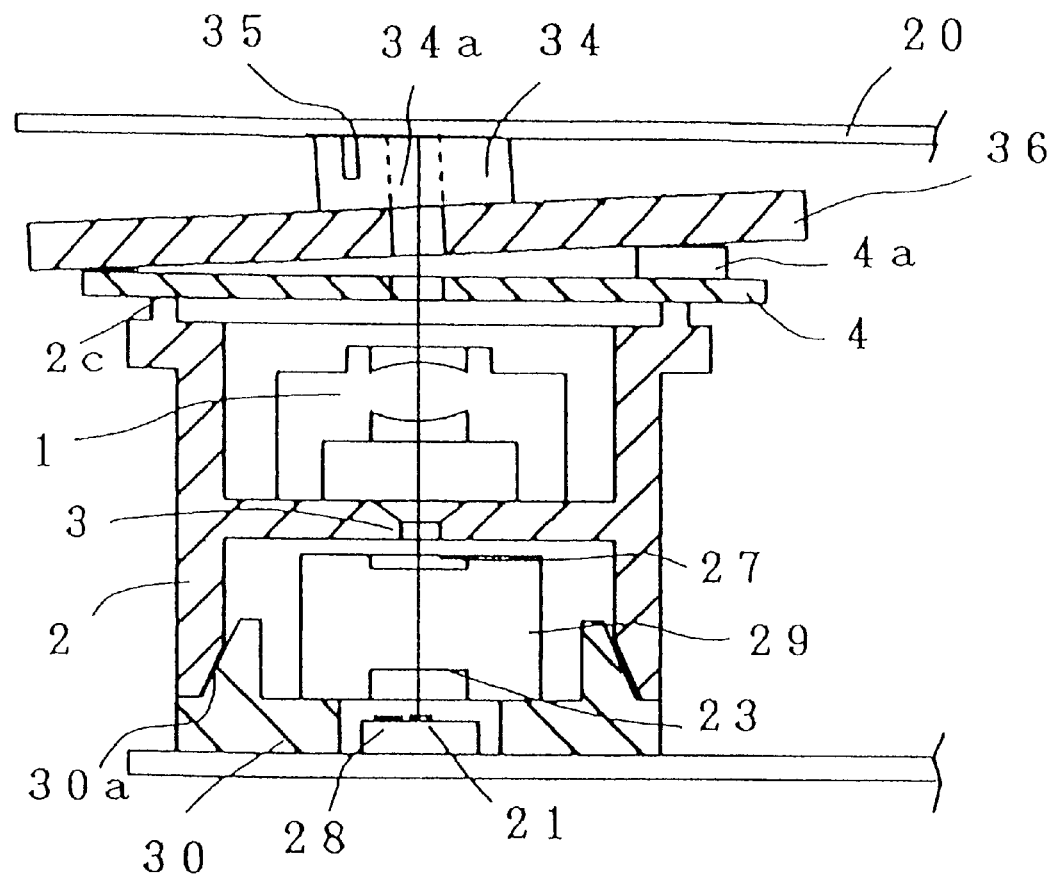
FIG. 6 is a diagram illustrating another method of adjusting a tilted optical axis in the present invention.

Since the recording medium 20 slides relatively to the sliding surface 34b of the magnetic head between the magnetic head 34 and a magnetic head (not shown) located above the recording medium 20 and facing the magnetic head 34, the surface of the recording medium 20 coincides with the magnetic head sliding surface 34b. At this time, if the magnetic head sliding surface 34b is not parallel to the head supporting plate 36, the extension of the line connecting the center of the objective lens 1 and the center of the aperture 3 can be allowed to traverse the surface of the recording medium 20 perpendicularly by providing the offset d as shown in FIG. 5. By establishing the offset d geometrically determined against the known tilted magnetic head 34, and aligning the center of the objective lens 1 to the center of the aperture 3, the tilt properties of the optical system can be improved.

As an alternate means to improve the tilt properties of the optical system, the addition of the auxiliary spacer 4a can similarly allow the optical axis to be perpendicular to the surface of the recording medium 20.

The magnetic disk unit according to the present invention is a magnetic disk unit optically sensing tracking information provided on a disk-shaped recording medium to position a magnetic head on the specific recording track of the recording medium, and magnetically recording the information on the recording medium or playing back the recorded information from the recording medium. The magnetic disk unit comprises an optical means formed below the magnetic head for radiating laser beams to the recording medium through the light path formed of the magnetic head and receiving the reflected light beams. The optical means comprises a laser source, a diffraction grating for splitting the laser beams from the laser source into a plurality of beams, an aperture for limiting a plurality of laser beams from the diffraction grating and light beams reflected from the recording medium, an objective lens for converging the light beams reflected from the recording medium, radiating them to the recording medium, and guiding the light beams reflected from the recording medium to the aperture, a beam splitter for splitting the reflected light beams having passed through the aperture, and a light receivers for receiving light beams split by the beam splitter. Since the objective lens is an objective lens telecentric to the image side, the output of the receiver sufficient for position sensing is obtained, and the deviation of a plurality of reflected light beams and imbalance of the output of the receiver due to the malfunction of the optical system are prevented resulting in the improvement of the servo properties and positioning accuracy.

In the magnetic disk unit, the optical means may be constructed so that a plurality of laser beam irradiating the recording medium may be radiated perpendicularly to the recording medium. Since the optical means may be formed so that a plurality of laser beams radiated perpendicularly to the recording medium without using mirrors, the optical axis can be adjusted easily.

In magnetic disk unit, the aperture of the optical means may be in the form of ellipse, and the diameters of a plurality of laser beams irradiating the recording medium may be controlled by the length of the minor axis of the aperture. Since the aperture of the optical means may be formed to be elliptic for controlling the diameters of a plurality of laser beams radiated to the recording medium with the length of the minor axis thereof, the spot diameters of the laser beams can be determined only by the length of the minor axis, the length in the major axis direction can be extended to an extent allowed by the effective diameter of the objective lens, the quantity of light passing through the aperture can be made sufficient, and the output of the light receiver can be increased, resulting in the improvement of efficiency.

In magnetic disk unit, the aperture may be formed on a holder for holding the objective lens. Since the aperture of the optical means may be provided on the holder holding the objective lens, the distance between the objective lens and the aperture can be made the f-value of the objective lens.

In magnetic disk unit, the laser source, the diffraction grating, the aperture, the objective lens and the recording medium may be arranged in a layered structure in the height direction, and the distance between the upper surface of the objective lens and the recording medium may be a predetermined length. Since the laser source, the diffraction grating, the aperture, the objective lens, and the magnetic head are layered in the height direction, and the distance between the upper surface of the objective lens and the recording medium is formed to be a specific length, the beam spot diameters of the laser beams can be adjusted to a specific value easily.

Here, the magnetic disk unit may further comprise a spacer for adjusting the distance between the upper surface of the objective lens and the recording medium to a predetermined length. Since the spacer for adjusting the distance between the upper surface of the object lens and recording medium to be a specific length is provided, the beam spot diameters of the laser beams can be adjusted to be a specific value easily.

Here, the magnetic disk unit may further comprise a tilt-angle compensating spacer for compensating a tilt angles which are angles between a plurality of laser beams and the recording medium. Since the spacer for correcting the tilt angle showing the angle produced by the laser beams and the recording medium is provided, a plurality of laser beams can be radiated perpendicularly to the recording medium easily.

According to the manufacturing method of the present invention, since the reference parallel light beams passing through the aperture are radiated from the laser source side for coinciding the center of the aperture to the center of the objective lens, and the aperture and the objective lens are assembled so as to align the center of the aperture and the image forming light of the objective lens, the center of the aperture can be coincided to the center of the objective lens easily.

Also according to the manufacturing method of the present invention, since the center of the aperture is made offset from the center of the objective lens, laser beams can be radiated perpendicularly to the recording medium easily.

The present invention has been described in detail with respect to various embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

The entire disclosure of Japanese Patent Application No. 10-332045 filed on Nov. 7, 1998 including specification, claims, drawings and summary are incorporated herein by reference in its entirety.

What is claimed is:

1. A magnetic disk unit for optically sensing tracking information recorded on a disk recording medium, thereby positioning a magnetic head to a predetermined recording track on said recording medium, and magnetically recording information on said recording medium, or playing back recorded information, the magnetic disk unit comprising:

an optical unit installed underneath said magnetic head, said optical unit radiating a laser beam onto said recording medium through a light path provided in said magnetic head and receiving the reflected beam, said optical unit including:

a laser source;

a diffraction grating for splitting the laser beam from said laser source into a plurality of beams;

an aperture for controlling the cross-sections of a plurality of laser beams from said diffraction grating and reflected light beams from said recording medium;

an objective lens for converging a plurality of laser beams from said aperture and irradiating said recording medium as well as guiding the reflected light beams from said recording medium to said aperture;

a beam splitter for splitting the reflected light beams transmitted through said aperture; and a light receiving member for receiving light beams split by said beam splitter, wherein said object lens is telecentric toward the image surface.

2. The magnetic disk unit according to claim 1, wherein said optical unit is constructed so that said plurality of beams irradiating said recording medium are radiated perpendicularly to said recording medium.

3. The magnetic disk unit according to claim 1, wherein said aperture of said optical unit is elliptical, and the diameters of said plurality of beams irradiating said recording medium are controlled by the length of the minor axis of said aperture.

4. The magnetic disk unit according to claim 1, wherein said aperture is formed on a holder for holding said objective lens.

5. The magnetic disk unit according to claim 1, wherein said laser source, said diffraction grating, said aperture, said objective lens and said recording medium are arranged in a layered structure in the height direction, and the distance between the upper surface of said objective lens and said recording medium is a predetermined length.

6. The magnetic disk unit according to claim 5, further comprising a spacer for adjusting the distance between the upper surface of said objective lens and said recording medium to a predetermined length.

7. The magnetic disk unit according to claim 6, further comprising a tilt-angle compensating spacer for compensating tilt angles, which are angles between said plurality of beams and said recording medium.

8. A method of manufacturing a magnetic disk unit for optically sensing tracking information recorded on a disk recording medium, thereby positioning a magnetic head to a predetermined recording track on said recording medium, and magnetically recording information on said recording medium, or playing back recorded information, the magnetic disk unit comprising:

an optical unit installed underneath said magnetic head for radiating a laser beam onto said recording medium through a light path provided in said magnetic head and receiving the reflected beam, said optical unit including:
a laser source;
a diffraction grating for splitting the laser beam from said laser source into a plurality of beams;
an aperture for controlling the cross-sections of a plurality of laser beams from said diffraction grating and reflected light beams from said recording medium;
an objective lens for converging a plurality of laser beams from said aperture and irradiating said recording medium as well as guiding the reflected light beams from said recording medium to said aperture;
a beam splitter for splitting the reflected light beams transmitted through said aperture;
a light receiving member for receiving light beams split by said beam splitter; and:
wherein said object lens being an objective lens telecentric toward the image surface, wherein said laser source, said diffraction grating, said aperture, said objective lens and said recording medium are arranged in a layered structure in the height direction, and the distance between the upper surface of said objective lens and said recording medium is a predetermined length, the method comprising the steps of:
radiating referent parallel light beams passing through said aperture from the side of said laser source for allowing the center of said aperture to coincide with the center of said objective lens; and
assembling said aperture and said objective lens so that the center of said aperture coincides with the image-forming light from said objective lens.

9. A method of manufacturing a magnetic disk unit for optically sensing tracking information recorded on a disk recording medium, thereby positioning a magnetic head to a predetermined recording track on said recording medium, and magnetically recording information on said recording medium, or playing back recorded information, the magnetic disk unit comprising:

an optical unit installed underneath said magnetic head for radiating a laser beam onto said recording medium through a light path provided in said magnetic head and receiving the reflected beam, said optical unit including:
a laser source;
a diffraction grating for splitting the laser beam from said laser source into a plurality of beams;
an aperture for controlling the cross-sections of a plurality of laser beams from said diffraction grating and reflected light beams from said recording medium;
an objective lens for converging a plurality of laser beams from said aperture and irradiating said recording medium as well as guiding the reflected light beams from said recording medium to said aperture;
a beam splitter for splitting the reflected light beams transmitted through said aperture;
a light receiving member for receiving light beams split by said beam splitter, wherein said object lens being an objective lens telecentric toward the image surface; and
wherein said laser source, said diffraction grating, said aperture, said objective lens and said recording medium are arranged in a layered structure in the height direction, and the distance between the upper surface of said objective lens and said recording medium is a predetermined length, the method comprising the step of:
assembling said aperture and said objective lens so that the center of said aperture offsets from the center of said objective lens depending upon the angle between the bottom surface of said magnetic head and the recording media sliding surface.

* * * * *